(12) United States Patent
Stover et al.

(10) Patent No.: US 7,712,292 B2
(45) Date of Patent: May 11, 2010

(54) CONTROL SYSTEM FOR OUTDOOR POWER EQUIPMENT

(75) Inventors: Dale A. Stover, Plymouth, MN (US); Merle W. Gaedy, Roseville, MN (US)

(73) Assignee: The Toro Company, Bloomington, MN (US)

( * ) Notice: Subject to any disclaimer, the term of this patent is extended or adjusted under 35 U.S.C. 154(b) by 547 days.

(21) Appl. No.: 11/270,757

(22) Filed: Nov. 9, 2005

(65) Prior Publication Data

US 2007/0101690 A1 May 10, 2007

(51) Int. Cl.
*A01D 69/00* (2006.01)

(52) U.S. Cl. .......................... 56/10.8; 56/11.3; 56/11.8; 180/19.3

(58) Field of Classification Search .............. 56/10.2 R, 56/10.5, 10.8, 11.3, 11.7, 11.8, 16.7, DIG. 6, 56/DIG. 15, DIG. 18; 180/19.1, 19.3, 315, 180/335; 123/361, 376
See application file for complete search history.

(56) References Cited

U.S. PATENT DOCUMENTS

| 3,028,717 | A | * | 4/1962 | West | 56/10.5 |
|---|---|---|---|---|---|
| 4,413,466 | A | * | 11/1983 | Beugelsdyk et al. | 56/11.3 |
| 4,667,459 | A | * | 5/1987 | Scanland et al. | 56/11.3 |
| 5,203,147 | A | * | 4/1993 | Long | 56/10.1 |
| 5,261,214 | A | * | 11/1993 | Wollersheim | 56/11.3 |
| 5,701,967 | A | * | 12/1997 | Barnard | 180/19.3 |
| 5,784,868 | A | * | 7/1998 | Wadzinski et al. | 56/10.8 |
| 5,806,374 | A | * | 9/1998 | Mizutani et al. | 74/483 PB |
| 6,220,005 | B1 | * | 4/2001 | Plamper et al. | 56/10.8 |
| 6,751,936 | B2 | * | 6/2004 | Kucera et al. | 56/10.8 |

* cited by examiner

*Primary Examiner*—Thomas B Will
*Assistant Examiner*—Mai T Nguyen
(74) *Attorney, Agent, or Firm*—James W. Miller (57) ABSTRACT

A control system for a BBC on a mower comprises a pivotal bail and a pivotal housing that is linked to the BBC. If a push member on the housing is pushed inwardly from the side of the housing before the bail is pivoted, then a pin moves to a blocking position behind the bail. Subsequent pivoting of the bail will pivot the housing to actuate the BBC. A channel in the housing frictionally grips the bail to prevent rebound of the bail when a spring force resets the housing and the bail to their initial positions after the operator releases the bail. Movement of the push member also closes an interlock switch which will kill operation of the engine if a grass discharge outlet on the mower is uncovered.

20 Claims, 5 Drawing Sheets

CONTROL SYSTEM FOR OUTDOOR POWER EQUIPMENT

TECHNICAL FIELD

This invention relates to a control system for actuating a component of an outdoor power equipment unit, such as a blade brake clutch on a mower. More particularly, this invention relates to a control system that requires two distinct operator actions before the component is actuated.

BACKGROUND OF THE INVENTION

Powered rotary lawn mowers are in wide use by consumers for cutting grass. Such rotary lawn mowers have a housing that encloses a sharpened cutting blade that rotates in a substantially horizontal cutting plane. A handle extends upwardly and rearwardly from the housing to allow an operator to walk behind the housing and to guide the housing during operation of the mower. The housing carries a prime mover, such as an electric motor or internal combustion engine, for rotating the cutting blade. A safety standard that is applicable to consumer lawn mowers requires that the blade come to a stop if the operator releases the handle. In addition, rotation of the blade can be initiated only if the operator performs two distinct actions. Manufacturers of such equipment have offered two major types of mowers that meet these requirements. These mowers comprise zone start mowers and blade brake clutch (BBC) mowers.

In a BBC mower equipped with an internal combustion engine, the engine can be started in a generally conventional manner, using either a rope pull or an electric starter. Once the engine is started, the engine remains running during the operation of the lawn mower unless the engine is purposely shut off by the operator. This is true even if the operator releases the control bail carried on the handle.

In a BBC mower, once the operator releases the control bail, a clutch between the blade and the output shaft of the engine is released and a blade brake is engaged. Thus, even though the engine continues to run, the blade comes to a stop. This can be contrasted with a zone start mower in which the blade comes to a stop once the control bail is released since the engine is killed, i.e. engine ignition is disrupted. Nonetheless, the result is the same in both cases, namely the blade comes to a stop when the operator releases the control bail.

However, in a BBC mower, the control bail must operate differently than in a zone start mower due to the need for two separate operator actions to reengage operation of the blade. In a zone start mower, the first action is the required restarting of the engine. The second action is the closing of the control bail against the crossbar of the handle.

But, in a BBC mower, restarting of the engine cannot be used as the first action since the engine remains running. Thus, the mower must be equipped with some type of additional control that must be actuated before the closure of the control bail is effective to start rotation of the blade. This additional control approach is shown in U.S. Pat. No. 5,784,868 to Wadzinski. Alternatively, the bail can have some type of multi-directional movement before the closure of the control bail places the blade back into operation, as disclosed in U.S. Pat. No. 4,327,539 to Bricko.

The control system used in a BBC mower to start and stop the rotation of the blade is necessarily more complex than that in a zone start mower. Generally speaking, such a BBC control system is not as intuitively obvious to use as that for a zone start mower. Accordingly, there is a need in the art for a BBC control system that is simple and relatively easy to understand and use.

SUMMARY OF THE INVENTION

One aspect of this invention relates to a control system for a component of an outdoor power equipment unit, the outdoor power equipment unit having a handle that includes a crossbar. The control system comprises a control member movably mounted to the handle. The control member being is movable back and forth on the handle in a predetermined path of motion. The control member is movable away from the crossbar into a disengaged position in which the control member is spaced from the crossbar and is movable towards the crossbar into an engaged position in which the control member is adjacent the crossbar. A housing is movably mounted to the handle. The housing is operatively linked to the component to engage the component when the housing is moved towards the crossbar. A push member is movably carried on the housing for sideward motion from a first lateral position on the housing to a second lateral position on the housing, the first and second lateral positions being laterally displaced from one another on the housing. A blocking member is carried on the push member. The blocking member is laterally clear of the path of motion of the control member when the push member is in the first lateral position thereof. The blocking member extends laterally into the path of motion of the control member when the push member is in the second lateral position thereof. Thus, motion of the control member towards the crossbar is linked to the housing through the blocking member on the push member such that the housing is also moved towards the crossbar to engage the component only if the push member is first pushed to the side between the lateral first and second positions thereof before the control member is moved between its disengaged and engaged positions.

Another aspect of this invention relates to a control system for actuating a component of an outdoor power equipment unit. The control system comprises a control member pivotally mounted on a handle of the outdoor power equipment unit. The control member is pivotal between a component disengaged position and a component engaged position. A housing is pivotally mounted on the handle, the housing being configured to be selectively disposed in a first position in which the housing is not pivoted by movement of the control member and a second position in which the housing is pivoted by movement of the control member. The housing is connected to the component to actuate the component when the housing is disposed in the second position and the control member is pivoted to its component engaged position. A switch is provided that changes state when the housing is disposed in the second position thereof, the change of state of the switch serving to stop operation of the component if a safety condition on the outdoor power equipment unit is not met.

Yet another aspect of this invention relates to a control system for a component of an outdoor power equipment unit. The control system comprises a pivotal housing and a pivotal control member that is able to indepently pivot relative to the housing. A cable connects the pivotal housing to the component for actuating the component when the pivotal housing is pivoted in one direction by pivotal motion of the control member in the one direction. A spring force is applied to the cable in a direction tending to pivot the housing oppositely to the one direction. A retainer is provided on the housing for frictionally retaining the control member in the housing to prevent rebound of the control member out of the housing when the spring force resets the housing and the control member to an initial position.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
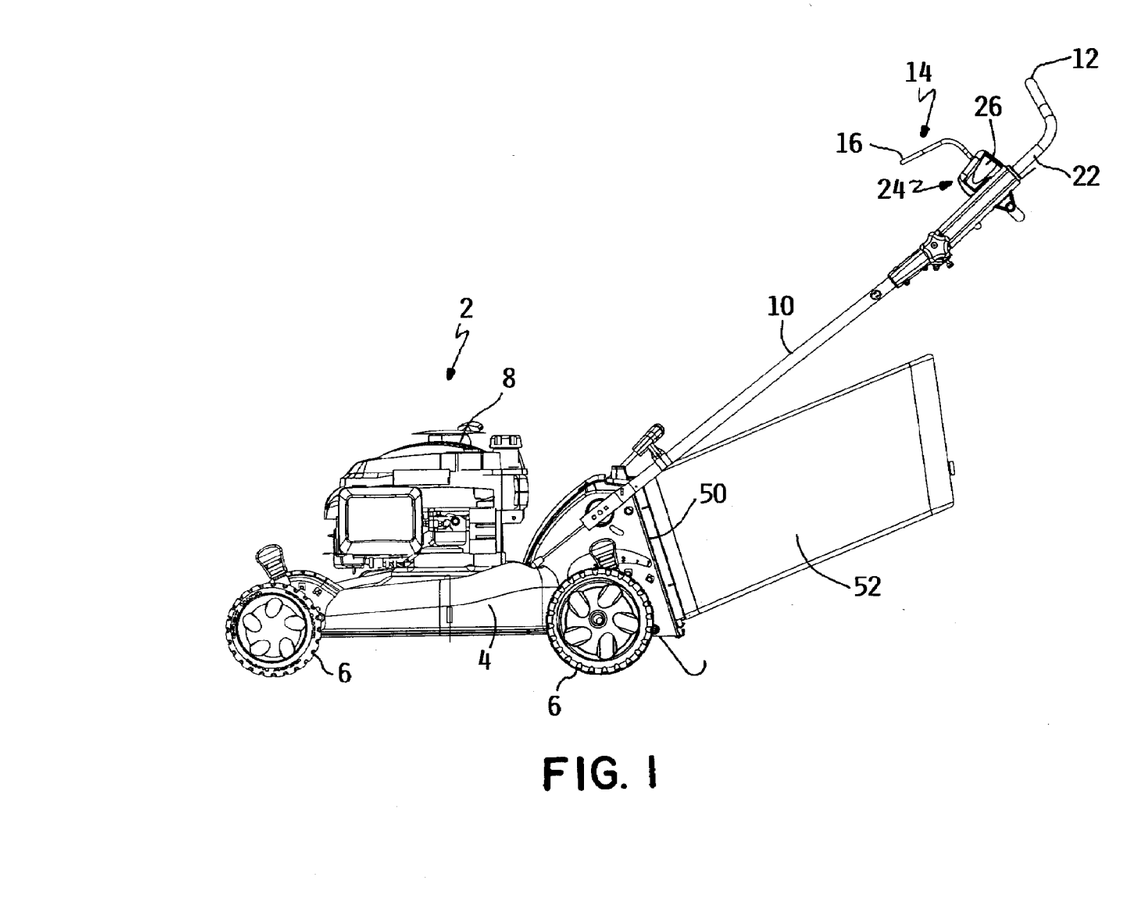
FIG. 1 is a perspective view of a lawn mower equipped with the control system of this invention.

Referring to FIG. 1, a typical rotary lawn mower is illustrated for background purposes generally as 2. Mower 2 has a cutting deck 4 supported for movement over the ground by a plurality of wheels 6 or the like. A prime mover, such as but not limited to an internal combustion engine 8, is provided on cutting deck 4 for rotating a cutting blade (not shown) that is housed within cutting deck 4. An upwardly and rearwardly extending handle 10 includes a transverse upper crossbar 12 that is gripped by the operator to guide and operate mower 2.

This invention relates to a control system, illustrated generally as 14, for engaging and disengaging a blade brake clutch (BBC) located between the cutting blade and engine 8. The BBC is not shown in FIG. 1 and may take any conventional design. When the BBC is engaged, the cutting blade is clutched to engine 8 and a blade brake is disengaged to permit the cutting blade to rotate. When the BBC is disengaged, the cutting blade is unclutched from engine 8 and the blade brake is engaged to stop the cutting blade from rotating. The purpose of control system 14 of this invention is to change the state of the BBC, i.e. to move the BBC from its disengaged state to its engaged state or vise versa.

While control system 14 will be described in conjunction with a mower 2 for actuating a BBC, control system 14 could be used with other types of outdoor power equipment units, such as snowthrowers, for actuating a different component, such as the snowthrowing impeller. Thus, control system 14 is not limited for use with a mower or for actuating a BBC.

Figure 2:
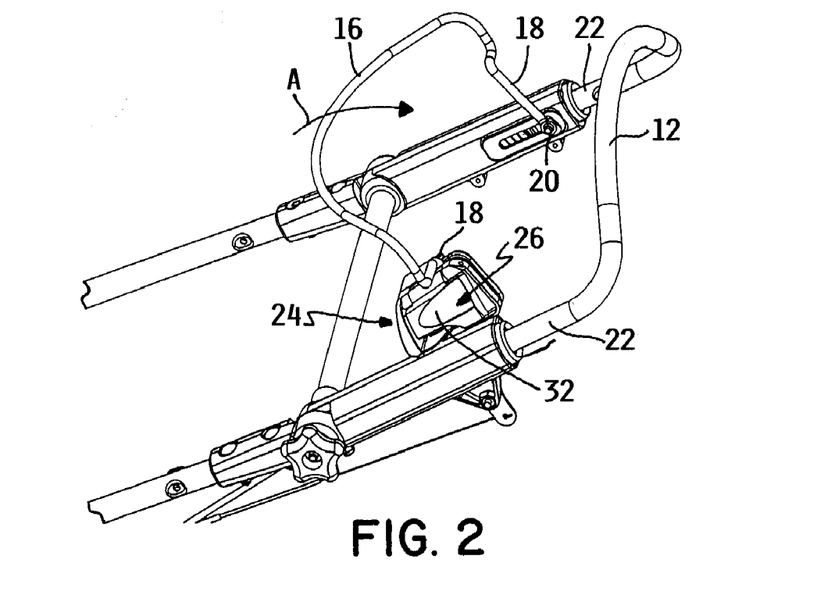
FIG. 2 is an enlarged perspective view of the control system shown in FIG. 1, particularly illustrating the control system in a component disengaged position with the control bail being rotated away from and spaced from the crossbar of the handle.
Figure 6:
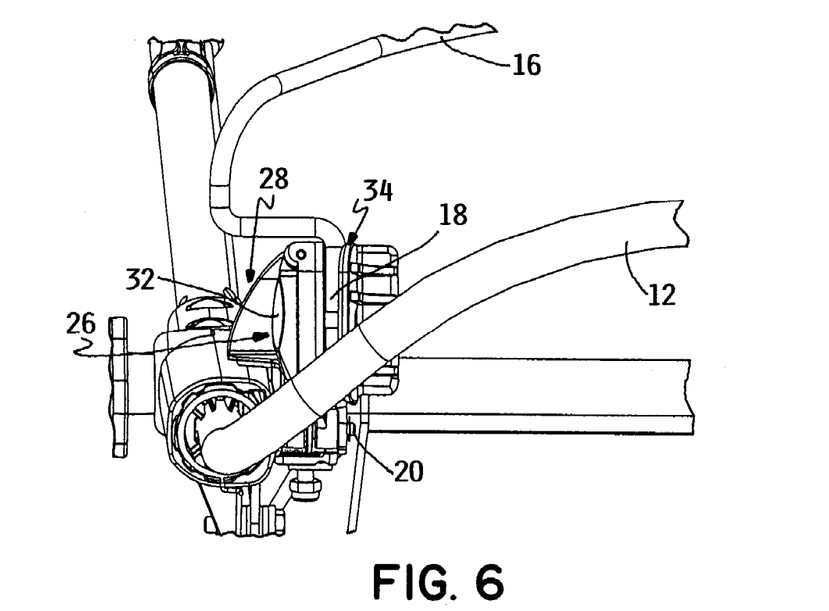
FIG. 6 is a perspective view from behind the control bail of the control system shown in FIG. 1, particularly illustrating the finger actuated push member being pivoted inwardly to its laterally inner, blocking position.
Figure 7:
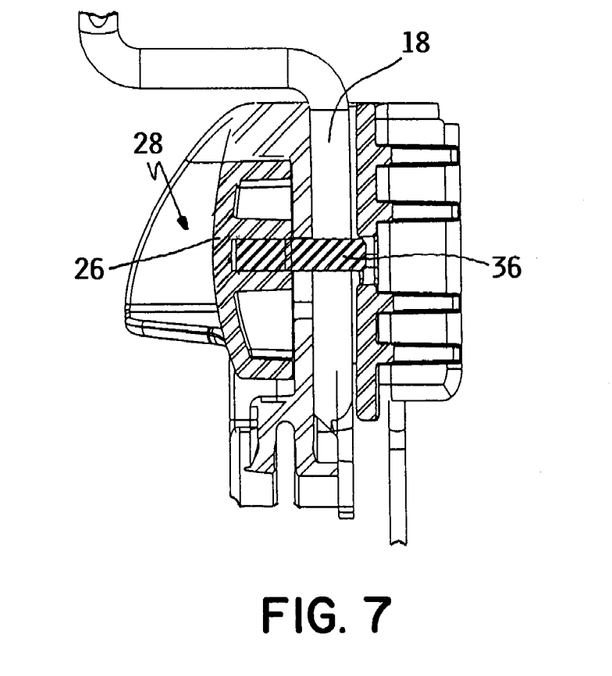
FIG. 7 is a cross-sectional view similar to FIG. 5, but particularly illustrating the finger actuated push member being pivoted inwardly to its laterally inner, blocking position.

One embodiment of a control system 14 according to this invention includes a control member in the form of a U-shaped bail 16. Bail 16 is carried at the top of handle 10 adjacent crossbar 12. Bail 16 has a pair of laterally spaced, downwardly extending legs 18 that are pivotally mounted along aligned transverse pivot pins 20 to the inside of a pair of handle tubes 22 of handle 10. One transverse pivot pin 20 is shown in FIG. 2. The other transverse pivot pin 20 is hidden from view in FIG. 2 but is shown in FIG. 6.

Figure 3:
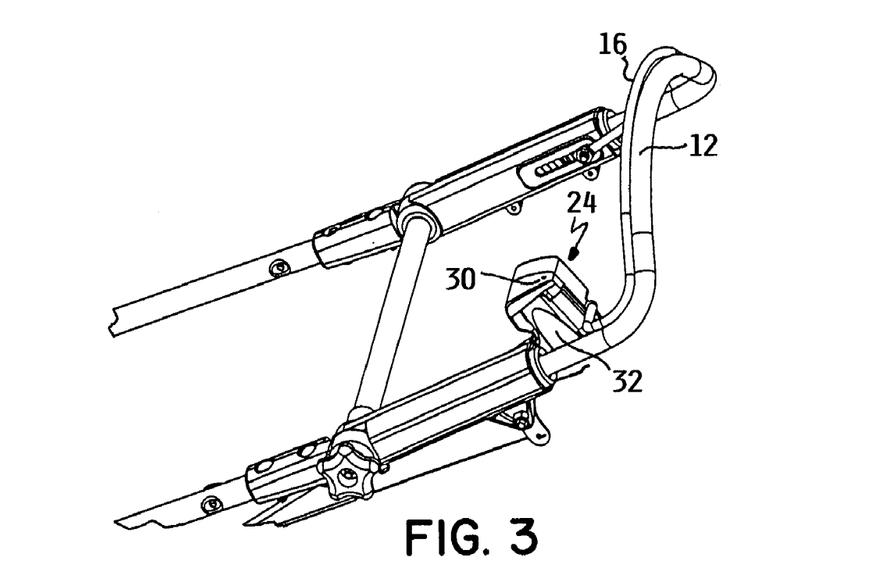
FIG. 3 is an enlarged perspective view similar to FIG. 2, but particularly illustrating the control system in a component engaged position with the control bail being rotated towards and held against the crossbar of the handle.

Bail 16 is pivotal about the axis of pivot pins 20 from a first disengaged position as shown in FIG. 2. In this position, bail 16 is rotated forwardly away from crossbar 12 of handle 10. However, bail 16 can be rotated rearwardly towards crossbar 12 of handle 10, as shown by the arrow A in FIG. 2, until bail 16 generally abuts or lies against crossbar 12 of handle 10. This is the engaged position of bail 16 as shown in FIG. 3.

A pivotal housing 24 is mounted on one of the pivot pins 20 that mounts bail 16 to handle 10. Thus, housing 24 is also pivotal about the same pivot axis around which bail 16 pivots. However, housing 24 is pivotal independently of bail 16. While housing 24 and bail 16 can pivot together as will be explained hereafter, bail 16 can also pivot without pivoting housing 24.

Housing 24 includes an outer side that faces outwardly relative to handle 10 and is located above handle tube 22 on which housing 24 is pivotally mounted. The outer side of housing 24 has a push member 26 that is pivotally received in an alcove 28 on the outer side of housing 24. Push member 26 is pivotal relative to housing 24 about a longitudinal pivot pin 30, namely a pivot pin 30 extending fore and aft rather than transversely. Thus, push member 26 can be pivoted inwardly from the outer side of housing 24 against a spring force that will be described hereafter.

Push member 26 can have any convenient shape. As shown herein, push member 26 is somewhat rectangular conforming to the general shape of alcove 28 in which push member 26 is received. Push member 26 has an arrowhead shaped, recessed portion 32 extending to the rear of push member 26. Recessed portion 32 has a roughened or textured surface compared to the rest of push member 26. The operator can insert a couple of fingers, namely the operator's index finger and middle finger, into recessed portion 32 of push member 26 to push inwardly on push member 26 from the side. Such an inward push from the side is illustrated by the direction of the arrow B in FIG. 5.

The rear of housing 24 includes a rearwardly facing channel 34 that extends between the top and bottom of housing 24. Channel 34 is wide enough to allow the adjacent leg 18 of bail 16 is be received within channel 34 when bail 16 is in its disengaged position. Desirably, one of the side walls of housing 24 forming channel 34 is angled or inclined somewhat inwardly such that bail 16 is received in channel 34 with an interference fit. The purpose for this will be described later.

Figure 5:
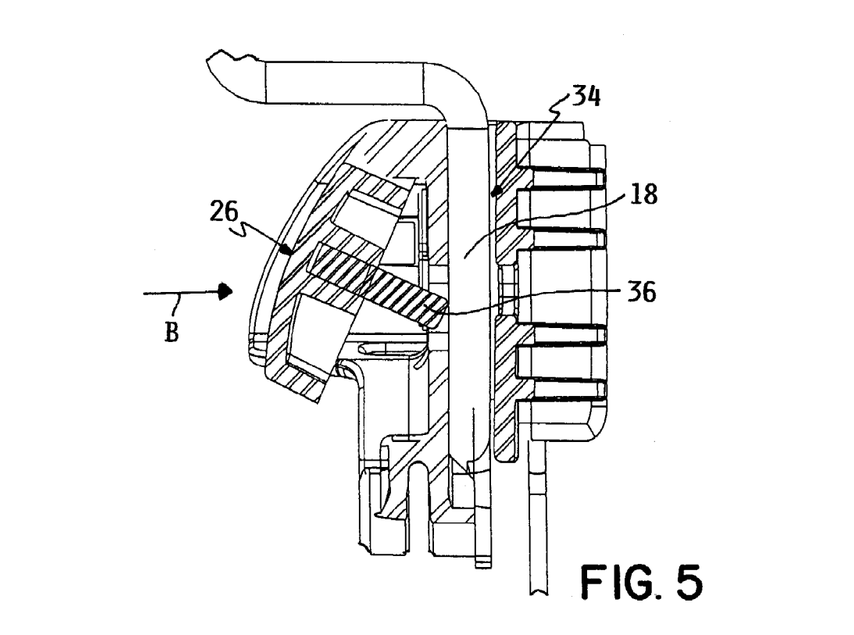
FIG. 5 is a cross-sectional view through the control system shown in FIG. 1, particularly illustrating the component disengaged position of the control system with the finger actuated push member being pivoted outwardly to its laterally outer, non-blocking position.

The backside of push member 26 has an inwardly extending pin 36 carried thereon. When push member 26 has not been pushed inwardly on the side of housing 24 but is biased to its laterally outer position as shown in FIG. 5, pin 36 clears channel 34 in which leg 18 of bail 16 is received. However, if the operator pushes push member 26 inwardly in the direction of the arrow B in FIG. 5, this will pivot push member 26 inwardly until push member 26 is now in a laterally inner, generally vertical position within alcove 28. In this position of push member 26 as shown in FIG. 6, pin 36 has moved into a blocking position in channel 34 behind or to the rear of leg 18 of bail 16.

The two actions required to actuate the BBC and to begin operation of the cutting blade comprise pushing inwardly on push member 26 using the fingers of one hand followed by then pivoting bail 16 rearwardly from the disengaged position shown in FIG. 2 to the engaged position shown in FIG. 3. If these two actions are performed in this sequence, then pin 36 will block off channel 34 in which the leg of bail 16 is received so that the pivoting motion of bail 16 will also pivot housing 24 as shown in FIG. 3. In effect, pin 36 temporarily joins housing 24 to bail 16 for conjoint rotation therewith.

Figure 4:
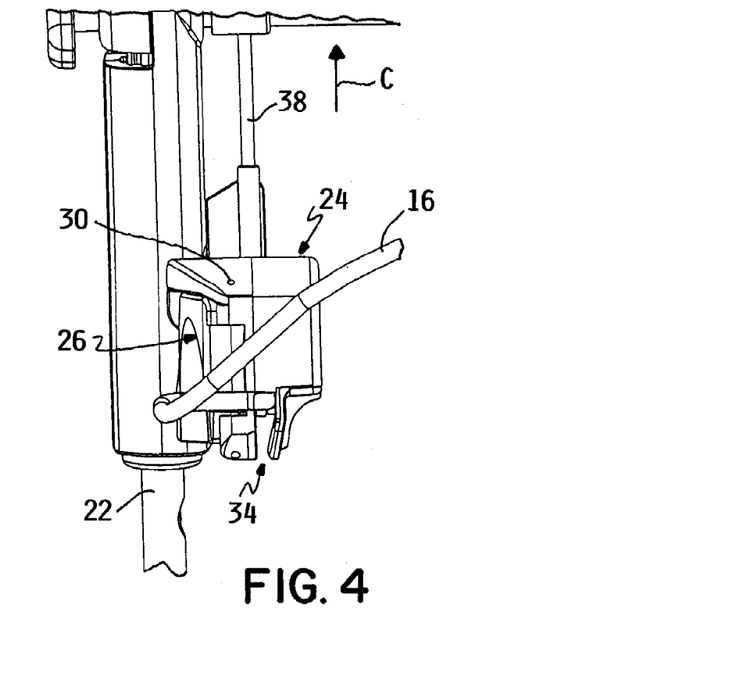
FIG. 4 is a perspective view from above the control bail of the control system shown in FIG. 1, particularly illustrating the component disengaged position of the control system with the finger actuated push member being pivoted outwardly to its laterally outer, non-blocking position.

A control cable 38, a portion of which is shown in FIG. 4, operatively connects housing 24 to the BBC. When housing 24 is pivoted with bail 16 as described above, the pivoting motion of housing 24 will pull rearwardly on control cable 38 to engage the BBC to cause blade rotation. When the operator releases bail 16 from its engaged position, the forward spring force normally present on control cable 38 will bias housing 24 and bail 16 back to the disengaged positions thereof shown in FIG. 2. This forward spring force is represented by the arrow C in FIG. 4.

In this regard, the interference press fit between channel 34 and leg 18 of bail 16 is used to prevent a rebound action of bail 16 out of housing 24 during the return motion of housing 24 and bail 16. The interference press fit is strong enough to provide a frictional gripping force on bail 16 that retains bail 16 within channel 34. Without such a frictional gripping force, the Applicants discovered that bail 16 would rebound rearwardly towards crossbar 12 when housing 24 returns to the position shown in FIG. 2. Such rebound would be strong enough to cause bail 16 to potentially snap back against the operator's fingers as the operator grips crossbar 12. This is prevented by the interference fit between channel 34 and leg 18 of bail 16. While the interference press fit could be dispensed with if so desired, its use is preferred.

Control system 14 disclosed herein is simple and intuitive to use. To engage the BBC, all the operator must do is push in on push member 26 and close bail 16 against crossbar 12 of handle 10. Push member 26 includes a finger receiving, recessed portion 30 that invites the operator to place his or her fingers there and to push inwardly. To emphasize the separate nature of push member 26, push member 26 and housing 24 in which it is received are made from differently colored plastic material, push member 26 being bright green and housing 24 being black for example.

In addition, if the operator simply pivots bail 16 without first pushing in on push member 26, the only thing that will happen is that bail 16 will slip out of channel 34 and become limp or untensioned. There is no direct spring force on bail 16. The only spring force acting on bail 16 is the spring force present on housing 24 from the spring force acting on control cable 38. Thus, as soon as the operator pulls bail 16 out of channel 34 and notices that there is no spring pressure acting on bail 16, the operator will know that something more need be done in order to actuate the BBC. The operator will quickly and intuitively figure out that bail 16 must be reset into channel 34 and that push member 26 must be pushed laterally inwardly before closing bail 16.

Figure 8:
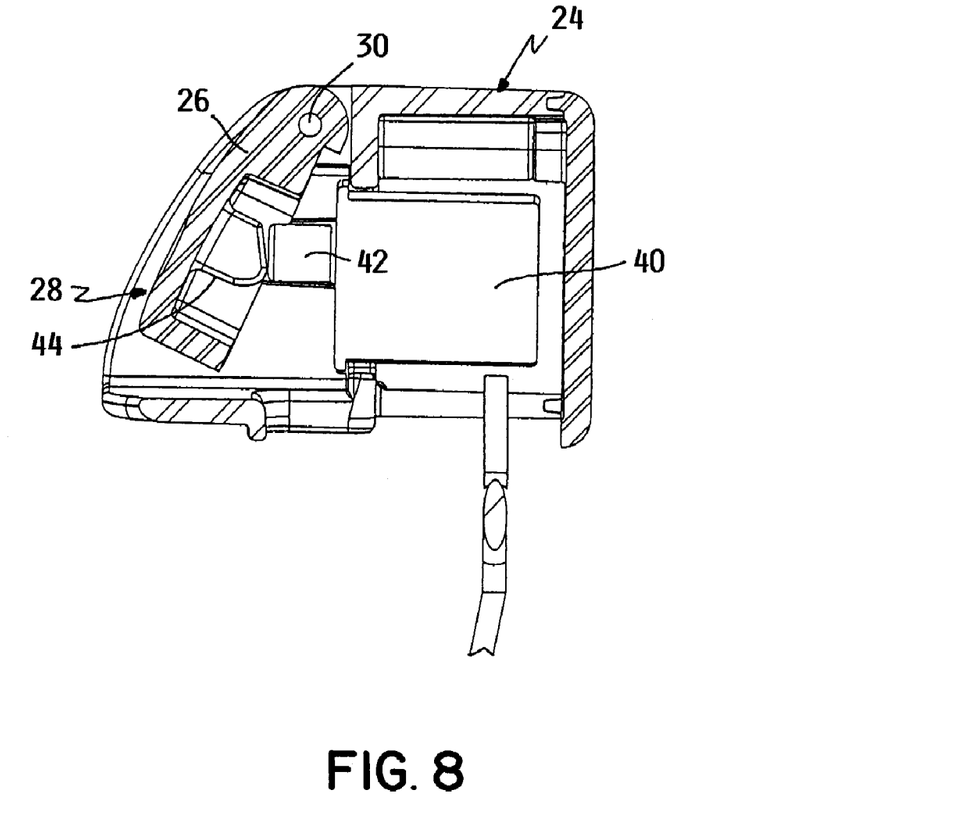
FIG. 8 is a cross-sectional view through the control system shown in FIG. 1, particularly illustrating the interaction between the finger actuated push member and a discharge interlock switch.

Another enhancement that is possible with control system 14 of this invention is the use of a discharge interlock switch 40 in housing 24. Interlock switch 40 is mounted in the forward part of housing 24 behind push member 26. As shown in FIG. 8, interlock switch 40 is a conventional electrical normally closed switch having a spring biased actuating plunger 42. Push member 26 has a switch actuating tab 44 in abutting engagement with switch plunger 42 as shown in FIG. 8. In fact, it is the outward bias of the spring contained inside interlock switch 40 acting on switch plunger 42 that provides the spring force that biases push member 26 into its laterally outer position in alcove 28 in housing 24. If interlock switch 40 were not used, then a separate spring would be needed to bias push member 26 outwardly to the side of housing 24.

Interlock switch 40 works in conjunction with a discharge outlet switch (not shown) located at the discharge outlet 50 of mower 2. If the discharge outlet switch does not detect the presence of either a bagging attachment 52 or a grass discharge chute or a mulch plug covering the rear discharge opening, then engine 8 will kill if push member 26 is pushed inwardly to actuate the BBC. Thus, if interlock switch 40 is opened by the inward movement of push member 26, engine 8 will continue to run only if the discharge outlet switch detects the presence of some device covering the discharge outlet opening. If the discharge outlet switch detects that the discharge outlet opening is uncovered when interlock switch 40 is opened, then engine 8 will kill even though this is a BBC equipped mower. This nullifies the engagement of the BBC to prevent the operation of the blade if the discharge outlet 50 is unobstructed.

Including interlock switch 40 as part of control system 14 is relatively simple and easy to do. It involves the simple addition of an electrical switch 40 into housing 24 that is already provided as part of control system 14. In addition, it uses the spring inside the switch to provide the spring force needed to bias push member 26 to its usual laterally outer position, thus obviating the need for a separate spring to do this. Yet, it provides another desirable feature in that it will not allow the operator to mow if either the bagging attachment, grass discharge chute or mulch plug is not properly secured to discharge opening 50. However, interlock switch 40 could be deleted if so desired without diminishing the other useful features of control system 14 of this invention, i.e. the simple intuitive use of control system 14 arising from push member 26.

Various modifications of this invention will be apparent to those skilled in the art. Thus, the scope of this invention is to be limited only by the appended claims.

We claim:

1. A control system for a component of an outdoor power equipment unit, the outdoor power equipment unit having a handle that includes a crossbar, which comprises:
 (a) a control member movably mounted to the handle, the control member being movable back and forth on the handle in a predetermined path of motion, wherein the control member is movable away from the crossbar into a disengaged position in which the control member is spaced from the crossbar and is movable towards the crossbar into an engaged position in which the control member is adjacent the crossbar;
 (b) a housing movably mounted to the handle, the housing being separate from the control member such that the control member is capable of being moved back and forth on the handle while the housing remains stationary on the handle, the housing being operatively linked to the component to engage the component when the housing is moved towards the crossbar;
 (c) a push member movably carried on the housing for sideward motion from a first lateral position on the housing to a second lateral position on the housing, the first and second lateral positions being laterally displaced from one another on the housing; and (d) a blocking member carried on the push member, wherein the blocking member is laterally clear of the path of motion of the control member when the push member is in the first lateral position thereof, wherein the blocking member extends laterally into the path of motion of the control member when the push member is in the second lateral position thereof, and wherein the push member links the control member to the separate housing through the blocking member such that motion of the control member towards the crossbar also moves the separate housing towards the crossbar only when the push member is first pushed to the side between the lateral first and second positions thereof before the control member is moved between its disengaged and engaged positions, the separate housing otherwise remaining stationary on the handle during movement of the control member whenever the push member is not first pushed to the side before the control member is moved between its disengaged and engaged positions.

2. The control system of claim 1, wherein the push member is spring biased into the first lateral position thereof.

3. The control system of claim 2, further including an electrical switch carried on the housing with the switch having a spring biased plunger in contact with the push member, wherein the spring bias on the push member is provided by the spring biased plunger of the electrical switch.

4. The control system of claim 3, wherein the push member produces a change of state of the electrical switch by depressing the plunger thereof when the push member moves between its lateral first and second positions.

5. The control system of claim 4, wherein the change of state of the electrical switch stops operation of the component even though movement of the push member and control member have engaged the component if a safety condition on the outdoor power equipment unit is not met.

6. The control system of claim 5, wherein the safety condition is whether a grass discharge outlet on the outdoor power equipment unit is covered by a bagging attachment, grass discharge chute, or mulch plug.

7. The control system of claim 1, wherein the housing has a channel which receives a portion of the control member when the control member is in the disengaged position thereof.

8. The control system of claim 7, wherein the channel has an interference fit with the portion of the control member that is received in the channel, and wherein the interference fit is sufficient to provide a frictional retaining force on the control member.

9. The control system of claim 8, wherein the control member is a U-shaped bail having a pair of downwardly extending legs, and wherein the portion of the control member that is received in the channel is one leg of the bail.

10. The control system of claim 1, wherein both the control member and the housing are pivotally mounted to the handle for pivoting motion on the handle.

11. The control system of claim 10, wherein the push member is pivotally mounted to the housing for pivoting motion about a longitudinally extending pivot axis.

12. The control system of claim 1, wherein the push member is mounted in an alcove on one side face of the housing.

13. The control system of claim 12, wherein the alcove is provided on a side face of the housing that faces laterally outwardly relative to the handle.

14. The control system of claim 1, wherein the outdoor power equipment unit is a mower and the component is a blade brake clutch.

15. A control system for actuating a component of an outdoor power equipment unit having an engine with the component being driven by the engine, which comprises:
(a) a control member pivotally mounted on a handle of the outdoor power equipment unit, the control member being pivotal between a component disengaged position and a component engaged position;
(b) a housing pivotally mounted on the handle with the housing carrying a push button, the housing being separate from the control member such that the control member is capable of being pivoted back and forth on the handle while the housing remains pivotally stationary on the handle, the housing being configured to be selectively disposed in a first configuration in which the push button has a first position on the housing and the housing is not pivoted by movement of the control member and a second configuration in which the push button has a second position on the housing and the housing is pivoted by movement of the control member, wherein the housing is connected to the component to actuate the component when the housing is first disposed in the second configuration thereof and the control member is thereafter pivoted to its component engaged position such that pivotal motion of the control member causes a corresponding pivotal motion of the housing; and
(c) an electrical switch contained within the pivotal housing with the switch being positioned to be contacted by the push button when the push button has been placed in the second position thereof, wherein the push button in the second position thereof both changes the state of the switch and also places the housing into the second configuration thereof in which subsequent pivotal motion of the control member causes a corresponding pivotal motion of the housing, the change of state of the switch serving to stop operation of the component by stopping the engine if a safety condition on the outdoor power equipment unit is not met even though the pivotal motion of the housing caused the component to become engaged.

16. The control system of claim 15, wherein the safety condition is covering a discharge outlet of the outdoor power equipment unit.

17. A control system for a component of an outdoor power equipment unit, which comprises:
(a) a pivotal housing;
(b) a pivotal control member that is separate from the pivotal housing and that is able to independently pivot relative to the housing, the pivotal housing and pivotal control member capable of being temporarily and selectively interlocked to one another by an operator such that the pivotal control member and pivotal housing will jointly pivot together only after being interlocked;
(c) a cable connecting the pivotal housing to the component for actuating the component when the pivotal housing is interlocked to the control member and is then jointly pivoted together with the control member in one direction by pivotal motion of the control member in the one direction, wherein a spring force is applied to the cable in a direction tending to pivot the housing oppositely to the one direction and an operator causes joint pivoting of the control member and the housing by applying a first level of hand pressure to the control member that is sufficient to overcome the spring force and pull on the cable; and
(d) a retainer on the housing for frictionally retaining the control member in the housing to prevent a rebound of the control member out of the housing when the spring force resets the housing and the control member to an initial position after the operator has released the control member, the frictional retaining force being sufficiently high to prevent the rebound but also being sufficiently small such that the operator using only the first level of hand pressure can overcome the frictional retaining force and cause the control member to become disengaged from the frictional retaining force whenever the control member is not interlocked with the pivotal housing.

18. The control system of claim 17, wherein the retainer on the housing comprises a channel in which a portion of the control member is received, the channel having an interference fit with the portion of the control member.

19. The control system of claim 18, wherein the control member comprises a U-shaped bail.

20. The control system of claim 18, wherein the control member is free of spring tension when the portion of the control member is outside of the channel.

* * * * *